United States Patent
Kato et al.

(10) Patent No.: US 6,207,355 B1
(45) Date of Patent: Mar. 27, 2001

(54) OPTICAL RECORDING MEDIUM AND METHOD FOR PRODUCING SAME

(75) Inventors: Yoshiaki Kato; Toshiyuki Kashiwagi, both of Tokyo (JP)

(73) Assignee: Sony Corporation

( * ) Notice: Subject to any disclaimer, the term of this patent is extended or adjusted under 35 U.S.C. 154(b) by 0 days.

(21) Appl. No.: 09/206,099

(22) Filed: Dec. 4, 1998

Related U.S. Application Data

(62) Division of application No. 08/879,814, filed on Jun. 20, 1997, now Pat. No. 5,933,409.

(30) Foreign Application Priority Data

Jun. 21, 1996 (JP) .................................................. 8-162136

(51) Int. Cl.[7] .................................................. G11B 7/007
(52) U.S. Cl. ..................... 430/321; 430/945; 369/275.1
(58) Field of Search ............................. 369/275.1, 288.1, 369/286.1; 430/320, 321, 945

(56) References Cited

U.S. PATENT DOCUMENTS

| | | | |
|---|---|---|---|
| 4,150,398 | * 4/1979 | Kojima et al. | 430/945 |
| 4,450,553 | * 5/1984 | Holster et al. | 369/286.1 |
| 4,655,876 | * 4/1987 | Kawai et al. | 430/321 |
| 5,149,607 | * 9/1992 | DeGraaf et al. | 430/321 |
| 5,238,786 | * 8/1993 | Kashiwagi et al. | 430/321 |
| 5,385,795 | * 1/1995 | Yuasa et al. | 430/321 |

OTHER PUBLICATIONS

Keiser, E.O., "VideoDisc Mastering" RCA Review, vol. 39(1), pp 60–86, Mar. 1978.*

* cited by examiner

Primary Examiner—Martin Angebranndt
(74) Attorney, Agent, or Firm—Sonnenschein, Nath & Rosenthal

(57) ABSTRACT

An optical recording medium having plural signal recording layers, in which a sufficient signal volume is secured even from the signal recording layer irradiated with the reproducing light beam from the opposite side of a transparent substrate with respect to its signal recording surface. If the recording medium has plural signal recording layers in which a reflective film is formed on a signal recording surface of the transparent substrate carrying crests and valleys, the crests and valleys are formed on each transparent substrates so that the value of asymmetry A1 of reproduced signals in the signal recording layer irradiated with the reproducing light beam from the side of the transparent substrate is substantially equal to the value of asymmetry A2 of reproduced signals in the signal recording layer irradiated with the reproducing light from the opposite side. The length and the width of the crests and valleys of the latter signal recording layer are preferably larger by a film thickness of the reflective film than the length and the width of the crests and valleys of the former signal recording layer.

4 Claims, 5 Drawing Sheets

OPTICAL RECORDING MEDIUM AND METHOD FOR PRODUCING SAME

This application is a divisional of Ser. No. 08/879,814, now U.S. Pat. No. 5,933,409.

BACKGROUND OF THE INVENTION

1. Field of the Invention

This invention relates to an optical recording medium having plural signal recording layers each having a reflective film formed on a transparent substrate carrying crests and valleys, and a method for producing the same. More particularly, it relates to an optical recording medium in which an approximately equal signal volume can be obtained from a signal recording layer irradiated with a light beam from the transparent substrate side and from a signal recording layer irradiated with a light beam from the opposite side by setting an asymmetry of reproduced signals in the recording layer illuminated by the light beam from the transparent substrate side so as to be substantially equal to an asymmetry of the reproduced signal in the recording layer from the opposite side, and a method for producing the same.

2. Description of the Related Art

Recently, an optical recording medium having plural recording layers has been proposed for achieving high-density recording. Such recording layer may be typified by such an optical recording medium having two recording layers in which a pair of transparent substrates are provided each having crests and valleys formed on its one major surface to record signals and a reflective film is further formed thereon to form a signal recording layer. These transparent substrates are bonded to each other with the reflective films facing each other. In such optical recording medium, the reflective film of one of the transparent substrates is designed to be semi-transparent and the reflective film of the other transparent substrate is designed as a usual reflective film.

For reproducing the information of the signal recording layers of such optical recording medium, a light beam is illuminated from the side of the transparent substrate carrying the semi-transparent film. The light beam is transmitted through the first transparent substrate, signal recording surface and the semi-transparent film in this order tp reach the usual reflective film. Thus, the information of the signal recording layer of the first transparent substrate carrying the semi-transparent film as the reflective film is reproduced by the light reflected by the surface of the semi-transparent film towards the transparent substrate, deposited to follow the profile of the crests and valleys, while the information of the signal recording layer of the second transparent substrate carrying the usual reflective film as the reflective film is reproduced by the light reflected by the opposite surface of the reflective film deposited to follow the profile of the signal recording surface.

This optical recording medium has, however, a drawback that a sufficient signal volume cannot be realized in the signal recording layer having the usual reflective film as a reflective film.

For example, in known optical recording medium having a sole signal recording layer, crests and valleys are formed on a major surface 101a of a transparent substrate 101 to form a signal recording surface and a reflective film 103 is formed thereon to form a signal recording layer. For reproducing the information of the signal recording layer of the optical recording medium, a light beam L1 is illuminated by an objective lens 102 from the side of the transparent substrate 101 to detect reflection by the reflective film 103. However, the light beam L1 is not illuminated from the side of the reflective film 103. In such optical recording medium, the film thickness of the reflective film 103 larger than the film thickness which will give a pre-set reflectance suffices. From the viewpoint of productivity, the film thickness of the reflective film 103 is set to approximately 500 Å.

With the above-described optical recording medium having two signal recording layers, a pair of transparent substrate, each having the signal recording layer comprised of a semi-transparent film or a usual reflective film as a reflective film on the signal recording surface, are bonded together so that the reflective films face each other, and the reproducing light is illuminated from the side of the transparent substrate carrying the reflective film. That is, with the signal recording layer of the transparent substrate carrying the reflective film, a light beam L3 is illuminated by an objective lens 107 from the side of the reflective film 106, that is from the opposite side of the transparent substrate 104 so that the information is reproduced by so-called reverse-direction reproduction.

Thus, in the signal recording layer of the transparent substrate carrying the semi-transparent film, the light beam is directly illuminated on the surface of the semi-transparent film towards the transparent substrate for directly detecting the profile of the crests and valleys on the transparent substrate. However, in the signal recording layer of the transparent substrate carrying the usual reflective film, a reproducing light beam L3 is illuminated on the opposite surface of the reflective film 106 to the transparent substrate so that the profile of the signal recording surface is detected via reflective film 106. Since the reflective film is formed within the valleys on the signal recording surface, these valleys are detected as being smaller by the thickness of the reflective film. The result is that, in the signal recording layer of the transparent substrate carrying the usual reflective film, the detected signal volume is smaller than the correct signal volume, such that a sufficient signal volume cannot be realized.

Recently, an optical recording medium having three or more signal recording layers, in addition to the above-described optical recording medium having two signal recording layers, has been proposed. In this type of the optical recording medium, only one of the signal recording layers has a usual reflective film, with other signal recording layer(s) having semi-transparent film(s). The signal recording layers are layered to form a transparent substrate with the signal recording layer having the usual reflective film facing the other signal recording layers, with the reproducing light beam being illuminated from the side of the outermost signal recording layer carrying the semi-transparent film. With this type of the optical recording medium, the reproducing light beam is illuminated on the signal recording layer having the usual reflective film from the opposite side with respect to the transparent substrate, such that a sufficient signal volume again cannot be achieved.

SUMMARY OF THE INVENTION

It is therefore an object of the present invention to provide an optical recording medium in which a sufficient signal volume can be obtained even from the signal recording layer illuminated by the reproducing light beam from the side of the transparent substrate with respect to its surface carrying the crests and valleys, and a method for producing the optical recording medium.

In one aspect, the present invention provides an optical recording medium having at least a first signal recording layer formed by a transparent substrate having formed thereon crests and valleys and a reflective film on the transparent substrate, the surface of the reflective film towards the transparent substrate being a signal recording surface, and a second signal recording layer formed by a transparent substrate having formed thereon crests and valleys and a reflective film on the transparent substrate, the surface of the reflective film opposite to the transparent substrate being a signal recording surface. The crests and valleys of the recording layers are formed so that an asymmetry A1 of reproduced signals obtained from the recording layer irradiated from the side of the crests and valleys with a light beam will be substantially equal to an asymmetry A2 of reproduced signals obtained from the recording layer irradiated with the light beam through the transparent substrate.

If an asymmetry of reproduced signals obtained from the recording layer irradiated from the side of the signal recording surface of the first signal recording layer is A1 and an asymmetry of reproduced signals obtained from the recording layer irradiated from the side of the transparent substrate of the reflective film of the second signal recording layer is A3, preferably the relation of A3>A1 is met.

Preferably, the asymmetry A3 is 10 to 15%.

Preferably, the length and the width of the crests and valleys of the recording layer irradiated with the light beam from the side of the signal recording surface are larger by a film thickness of the reflective film than the length and the width of the crests and valleys of the recording layer irradiated with the light beam through the transparent substrate.

In another aspect, the present invention provides a method for producing an optical recording medium including the steps of forming crests and valleys to form pits corresponding to information signals on a master disc by light exposure and development, forming a transparent substrate having crests and valleys by transcription from the master disc, forming a reflective film on a surface of the transparent substrate having the crests and valleys formed thereon, and bonding a plurality of signal recording layers each comprised of the transparent substrates having the reflective films formed thereon. The laser power and/or the developing time during light exposure of the master disc used for molding the transparent substrate of the signal recording layer irradiated with the light beam from the transparent substrate to the reflective film are controlled to differ from the laser power and/or the developing time during light exposure of the master disc used for molding the transparent substrate of the signal recording layer irradiated with the light beam from the opposite side to the reflective film depending on the film thickness of the reflective film.

Preferably, the laser power and/or the developing time are controlled so that the crests and valleys on the transparent substrate of the signal recording layer irradiated with the light beam from the reflective film to the transparent substrate will be larger than those on the transparent substrate of the signal recording layer irradiated with the light beam from the transparent substrate to the reflective film.

With the optical recording medium of the present invention, if an asymmetry of reproduced signals obtained from the recording layer irradiated from the side of the crests and valleys of the first signal recording layer is A1 and an asymmetry of reproduced signals in the recording layer irradiated from the opposite side with the light beam is A2, A1 is approximately equal to A2, so that a sufficient signal volume can be obtained from the signal recording layer from which the information is reproduced by so-called reverse direction reproduction as from the signal recording layer from which the information is reproduced by so-called forward direction reproduction.

If, in the optical recording medium of the present invention, the length and the width of the crests and valleys of the signal recording layer irradiated with the light beam from the side opposite to the transparent substrate are larger by a film thickness of the reflective film than the length and the width of the crests and valleys of the signal recording layer irradiated with the light beam from the transparent substrate, the size of crests and valleys of the signal recording layer illuminated by the light beam from the side opposite to the transparent substrate is apparently equal to that illuminated by the light beam from the side of the transparent substrate. In this manner, the signal volume equal to the former signal recording layer reproduced by reverse direction reproduction may be obtained from the latter signal recording layer reproduced by the forward direction reproduction, so that a sufficient signal volume may be obtained even from the former signal recording layer reproduced by reverse direction reproduction.

DESCRIPTION OF THE PREFERRED EMBODIMENTS

Figure 1:
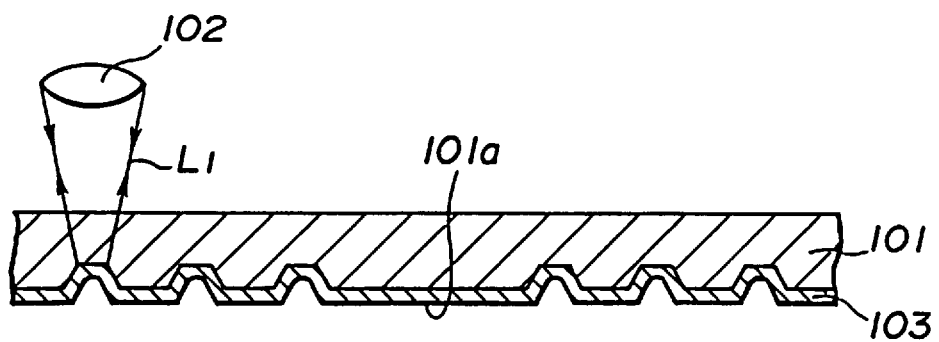
FIG. 1 is a schematic cross-sectional view of a prior art optical recording medium.
Figure 2:
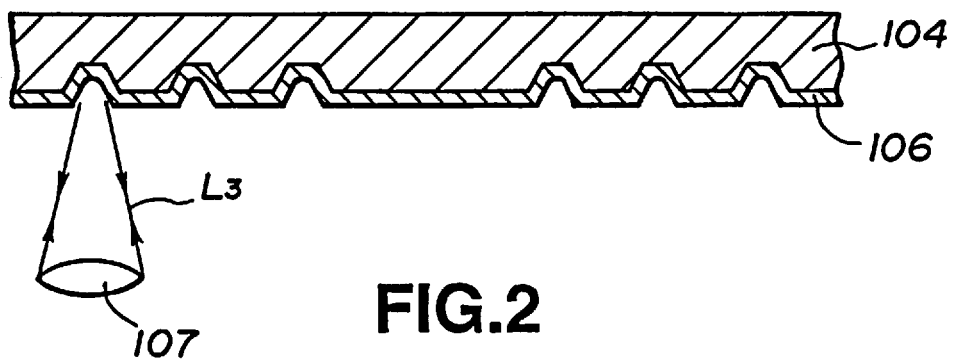
FIG. 2 is a schematic cross-sectional view of another prior art optical recording medium.

Referring to the drawings, preferred embodiments of the present invention will be explained in detail. The explanation herein is directed to an optical recording medium having two signal recording layers.

Figure 3:
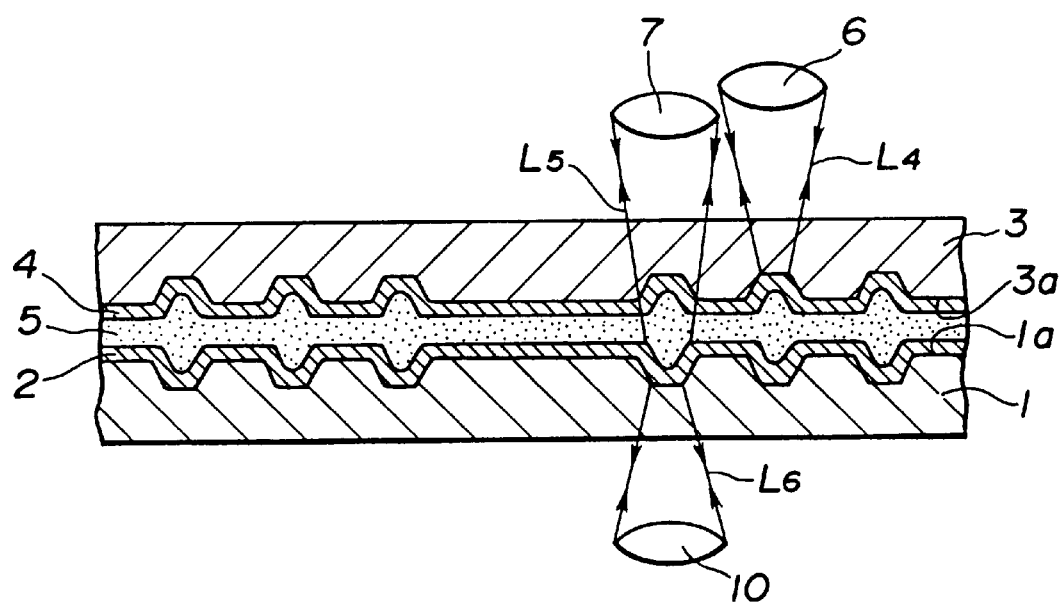
FIG. 3 is a schematic cross-sectional view showing an embodiment of an optical recording medium according to the present invention.

Referring to FIG. 3, the optical recording medium of the instant embodiment includes a first transparent substrate 1 and a second transparent substrate 3. The first transparent substrate 1 has a major surface 1a formed with crests and valleys constituting pits, and a reflective film 2, such as a thin aluminum film, as a reflective film on the surface for forming crests and valleys thereon, to form a signal recording layer. The second transparent substrate 3 has a major surface 3a formed with crests and valleys constituting pits and a semi-transparent film 4, such as a dielectric film, as a reflective film on the surface for forming crests and valleys thereon, to form a signal recording layer. The transparent substrates 1, 3 are bonded together by an adhesive 5 so that the major surfaces 1a, 3a thereof constituting the signal recording layers will face each other.

In the optical recording medium of the present embodiment, the information formed on the two signal recording layers is reproduced from the side of the second transparent substrate 3. That is, a light beam L4 is illuminated on the crests and valleys formed on the second transparent substrate 3 by an objective lens 6 mounted on the second transparent substrate 3, as shown in FIG. 3, for reproducing the information of the signal recording layer by exploiting the reflection of the semi-transparent film 4. That is, the surface of the semi-transparent film 4 towards the transparent substrate 3 serves as a signal recording surface. On the other hand, the crests and valleys formed on the first transparent substrate 1 are irradiated with a light beam L5 from the side of the reflective film 2 by an objective lens 7 mounted on the side of the second transparent substrate 3 for reproducing the information of the signal recording layer by exploiting the reflection of the reflective film 2. That is, the surface of the reflective film 2 opposite to the transparent substrate 1 serves as a signal recording surface.

Figure 4:
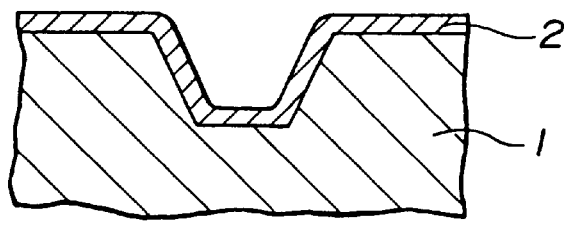
FIG. 4 is a schematic cross-sectional view showing another embodiment of an optical recording medium according to the present invention.
Figure 5:
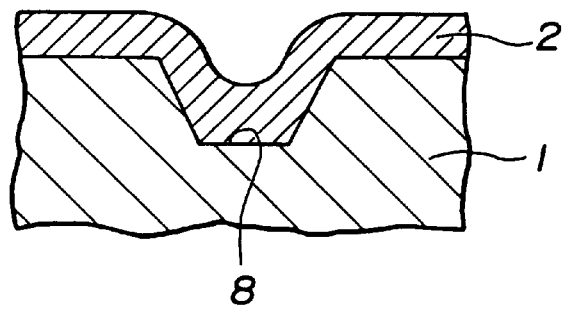
FIG. 5 is a schematic cross-sectional view for descriptive purposes.

If the reflective film 2 formed on the first transparent substrate 1 is too thin, as shown schematically in FIG. 4, the reproducing light L5 is lowered in reflectance, such that a sufficient signal volume is not produced. However, if the reflective film 2 is of a thickness to give sufficient reflectance, as shown schematically in FIG. 5, a valley 8 constituting a pit of the signal recording layer along with the crest is frequently buried by the reflective film 2, such that a sufficient signal volume can scarcely be produced.

Figure 6:
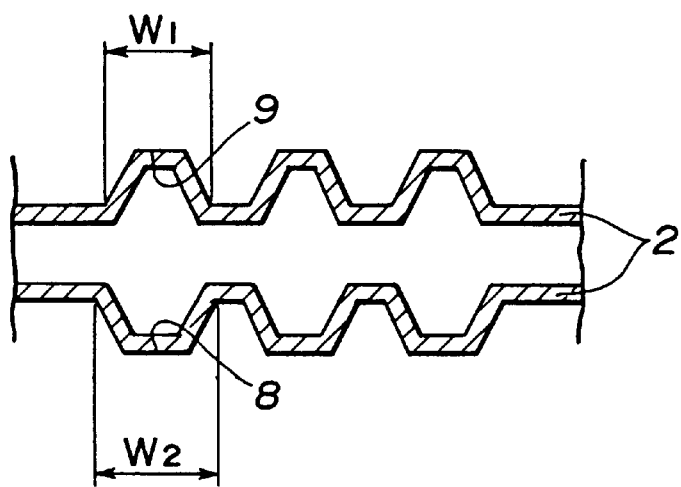
FIG. 6 is a schematic cross-sectional view showing a further embodiment of an optical recording medium according to the present invention.

Thus, in the optical recording medium of the present embodiment, a length and a width W2 of the valley 8 of the signal recording layer from which the information is reproduced by reverse direction reproduction by the light beam illuminated from the side of the reflective film 2 are set so as to be larger by a film thickness of the reflective film 2 than a length and a width W1 of a valley 9 of the signal recording layer from which the information is reproduced by forward direction reproduction by the light beam illuminated from the side of the transparent substrate, respectively. In FIG. 6, only the widths W1 and W2 are shown. Referring to FIG. 3, an asymmetry A2 of a reproduced signal obtained in case the information is reproduced by reverse direction reproduction by illuminating a reproducing light beam L5 by an objective lens 7 from the side of the transparent substrate 3 to the signal recording layer, the information of which should be reproduced by reverse direction reproduction by the reproducing light irradiated from the side of the reflective film 2, is set so as to be approximately equal to an asymmetry A1 of the reproduced signal of the signal recording layer the information of which is reproduced by forward direction reproduction by the reproducing light beam illuminated from the side of the transparent substrate 3, as shown in FIG. 3.

The asymmetry is represented by the following equation (1):

$$[(I_{Ltop} + I_{Lpit}) - (I_{Htop} + I_{Hpit})]/2(I_{Lpit} - I_{Ltop}) \quad (1)$$

where $I_{Lpit}$, $I_{Ltop}$ denote return light levels of the longest valley and land, respectively, while $I_{Hpit}$ and $I_{Htop}$ denote return light levels of the shortest valley and land, respectively.

Figure 7:
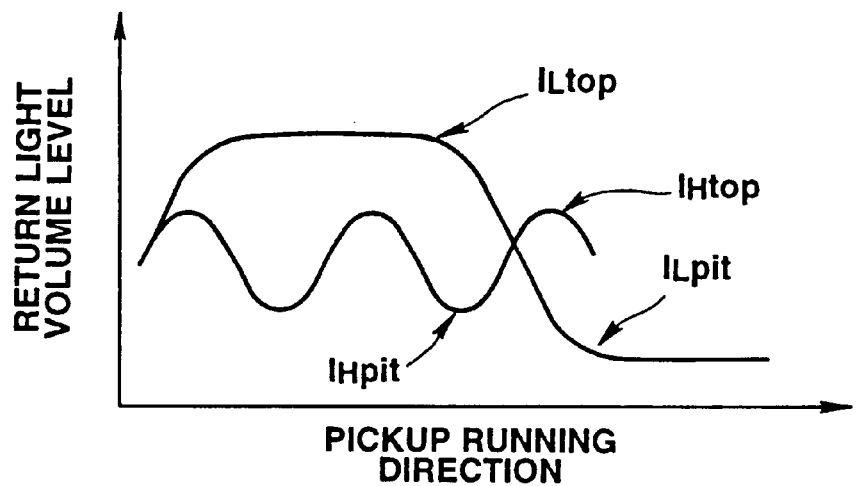
FIG. 7 is a graph showing the return light volume level versus the pickup running direction.

On the other hand, the return light volumes are related with each other as shown in FIG. 7. It is thus seen that the larger the size of the crests and valleys, the larger becomes asymmetry. Thus, if the length and the width of the crests and valleys of one of the signal recording layers are set so as to be larger than those of the opposite side signal recording layer, the asymmetry of the former signal recording layer becomes larger than asymmetry of the other signal recording layer. Meanwhile, since the crests and valleys on the transparent substrate 1 shown in FIG. 3 can be correspondingly diminished on length and width, by forming the reflective film, it becomes possible to apparently equate the size of the crests and valleys on the transparent substrate 1 to that of the crests and valleys on the transparent substrate 3.

Thus, in the optical recording medium of the instant embodiment, the length and the width of the crests and valleys of the signal recording layer, from which the information is reproduced by the reverse direction reproduction by the reproducing light beam from the side of the reflective film, are selected to be larger in an amount equal to the film thickness of the reflective film than those of the crests and valleys, from which the information is reproduced by the forward direction reproduction by the reproducing light beam from the side of the transparent substrate. That is, if an asymmetry of reproduced signals obtained by forward direction reproduction by the reproducing light beam L6 via objective lens 10 from the side of the transparent substrate to the signal recording layer, the information of which is reproduced by reverse direction reproduction, is A3, and an asymmetry of reproduced signals obtained from the recording layer illuminated by forward direction reproduction by the reproducing light beam illuminated for the side of the transparent substrate, is A1, the relation of A3>A1 is met.

Therefore, with the signal recording layer from which the information is reproduced by reverse direction reproduction by a light beam illuminated from the opposite side surface of the transparent substrate 1, a signal volume comparable to that from the signal recording layer the information of which is reproduced by the forward direction reproduction by the light beam illuminated from the side of the transparent substrate 3, such that a sufficient signal volume is also obtained from the signal recording layer from which the information is reproduced by the reverse direction reproduction.

The method for producing an optical recording medium of the present embodiment is now explained. The method for producing the optical recording medium of the present embodiment is substantially similar to that for producing a usual optical recording medium having two signal recording layers.

First, a master disc, having crests and valleys formed by light exposure and development responsive to information signals of the signal recording layer, is fabricated. Specifically, the following method may be used, as an example. Two glass plates, on one surfaces of which photoresist layers are formed, are prepared. The photoresist layer of each glass plate is exposed to a laser light beam to a profile corresponding to the information of the signal recording layer and is developed to produce glass discs corresponding to first and second transparent substrates. The surfaces of the glass discs for forming crests and valleys thereon are plated electrically to produced metal masters.

Then, transparent substrates having surfaces for forming crests and valleys thereon are molded by transcription. Specifically, the following method may be used, as an example. The above-mentioned metal masters are built into a metal mold and molded by injection molding to from first and second transparent substrates each having a major surface formed as a surface for forming crests and valleys thereon.

A reflective film is then formed on the surface of the transparent substrate for forming crests and valleys thereon. Specifically, a usual reflective film is formed as a reflective film on the surface of the first transparent substrate for forming crests and valleys thereon, while a semi-transparent film is formed as a reflective film on the surface of the second transparent substrate for forming crests and valleys thereon.

The transparent substrates, carrying the reflective films, are bonded together to complete an optical recording medium. Specifically, these first and second transparent substrates are layered together so that the reflective film of the first transparent substrate will face the semi-transparent film of the second transparent substrate, and are bonded together by a transmitting adhesive to complete the optical recording medium.

In producing the optical recording medium of the present embodiment, the laser power and/or the developing time during light exposure of the master discs used for molding the second transparent substrate irradiated with the light beam from the side of the transparent substrate and the first transparent substrate irradiated with the reproducing light beam from the opposite side are set so as to differ depending on the film thickness of the reflective film so that the length and the width of the valleys of the first transparent substrate will be larger by a film thickness of the reflective film than those of the valleys of the second transparent substrate.

If the optical recording medium of the present embodiment is prepared as described above, the optical recording medium can be produced with high productivity without requiring any special step.

For producing the optical recording medium of the present embodiment, such a method may be used in which the temperature of a metal mold used for injection molding the master in the above-mentioned production method is varied, with the length and the width of the crests and valleys of the two signal recording surfaces remaining unchanged, for enlarging the length and the width of the crests and valleys of the first transparent substrate as compared to those of the second transparent substrate. The temperature of the metal mold can be set to 120° C. and 100° C. during molding the first and second transparent substrates, respectively. If such method is used, the optical recording medium of the present embodiment can be manufactured without requiring special steps thus assuring improved productivity.

Figure 8:
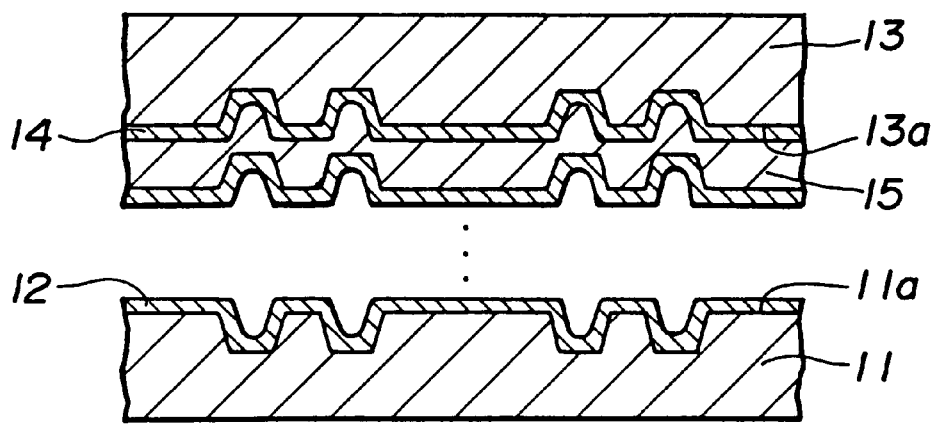
FIG. 8 is a schematic cross-sectional view showing yet another embodiment of an optical recording medium according to the present invention.

The present invention may be applied to an optical recording medium having three or more signal recording layers, as shown in FIG. 8.

Such optical recording medium includes a first transparent substrate 11 having its major surface 11a formed with crests and valleys, and a reflective film 12, as a usual reflective film, formed thereon. The optical recording medium also includes a second transparent substrate 13 having its major surface 13a formed with crests and valleys, and a reflective film 14, as a semi-transparent film, formed thereon. The optical recording medium also includes a third transparent substrate 15 similar in structure to the second transparent substrate 13 and a further substrate, not shown. The optical recording medium is completed by bonding these transparent substrates together.

With the optical recording medium having three or more signal recording layers, similarly to the above-described optical recording medium having two signal recording layers, a sufficient signal volume cannot be obtained from the signal recording layer having the usual reflective film.

If the present invention is applied to such optical recording medium, that is if the length and width of the crests and valleys of the signal recording layer having the usual reflective film are set so as to be larger than those of the other signal recording layers for modifying the pit size so that an asymmetry A1 of the reproduced signal in the signal recording layer from which the information is reproduced by forward reproduction by illuminating a light beam from the side of the transparent substrate will be approximately equal to an asymmetry A2 of the reproduced signal obtained on illuminating the reproducing light beam from side of the transparent substrate in the signal recording layer from which the information is reproduced by reverse direction reproduction by the reproducing light beam radiated from the opposite side.

Such optical recording medium can be produced in the same way as the optical recording medium having the two signal recording layers as described above without requiring any special process, thus assuring improved productivity.

EXAMPLE

Figure 9:
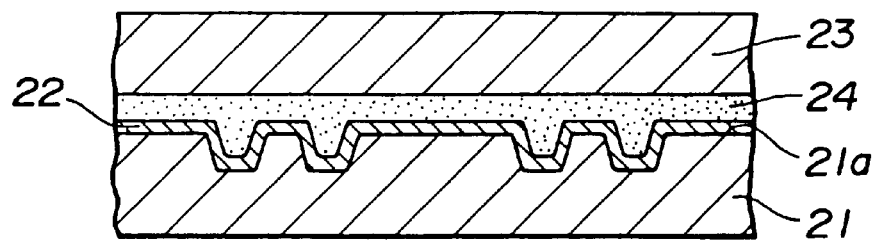
FIG. 9 is a schematic cross-sectional view showing an optical recording medium used in an experiment.

For ascertaining the effect of the present invention, the following experiment was conducted. First, two transparent substrates, each 0.6 mm in thickness, were provided. Each of the transparent substrates had its major surface formed as a signal recording surface having recorded thereon EFM signals and having a track pitch of 0.74 $\mu$m and the minimum pit length of 0.40 $\mu$m. A reflective film 22 was formed on a major surface 21a of the first transparent substrate 21 operating as a signal recording surface, as shown in FIG. 9. The first transparent substrate 21 and a second transparent substrate 23 were layered together with the signal recording layers facing each other with a light-transmitting adhesive 24 in-between to produce an optical recording medium. The reflective film 22 was formed by depositing aluminum by ion beam sputtering as a thin aluminum film having a thickness of the order of 500 to 700 Å.

Figure 10:
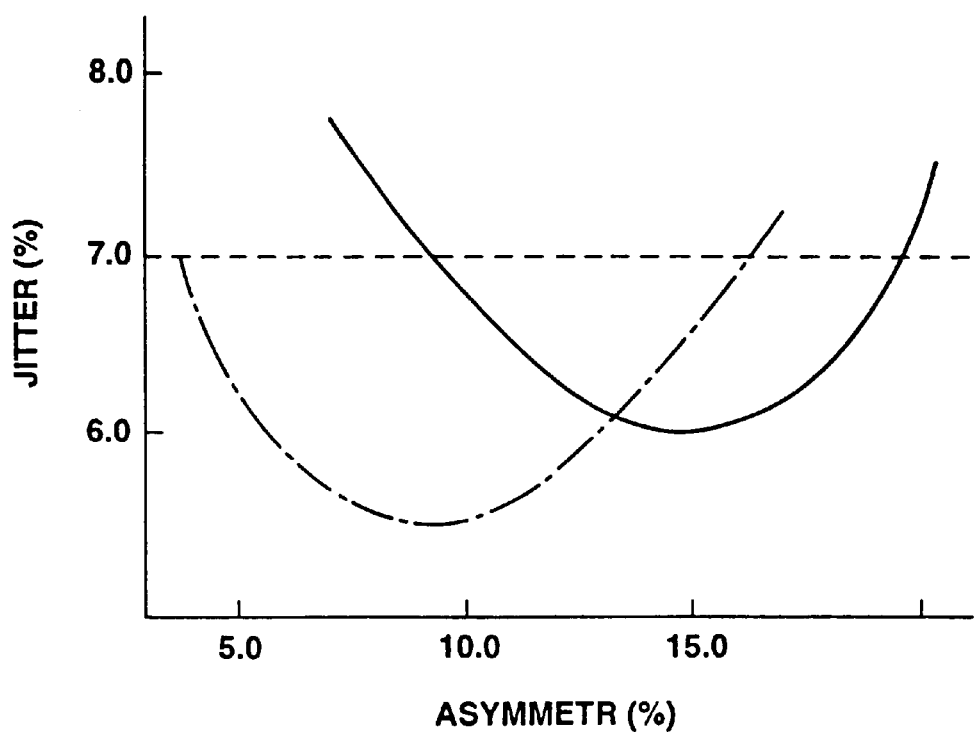
FIG. 10 is a graph showing asymmetry versus jitter.

Using lenses having the numerical apertures NA of 0.6, as reproducing objective lenses, laser light beams of a wavelength of 635 nm were illuminated from the side of the second transparent substrate 23 and from the side of the first transparent substrate 21 as reproducing light beams for investigating the relation between asymmetry and jitter. The results are shown in FIG. 10, in which an abscissa and the ordinate denote the values of asymmetry and those of jitter. In FIG. 10, solid lines denote the relation between asymmetry and jitter in case the reproducing light beam is illuminated from the side of the first transparent substrate 21 and a chain-dotted line denotes the same relation in case the reproducing light beam is illuminated from the side of the second transparent substrate 23.

It is seen from the results of FIG. 10 that, for the same value of the jitter, the value of asymmetry in case of reproduction from the second transparent substrate 23, that is in case of reverse-direction reproduction, is smaller than that in case of reproduction from the first transparent substrate 21, that is in case of forward direction reproduction. That is, it has been ascertained that the valley of the pit of the signal recording layer is buried in the reflective film, such that, in case of reproduction from the side of the second transparent substrate 23, in other words, from the side of the reflective film 22, the valley is detected as a pit smaller by an amount equal to the film thickness of the reflective film 22.

Thus it has been confirmed that, if the length and the width of the valley of the pit of the signal recording layer, the information from which is reproduced by reverse direction reproduction with the reproducing light beam illuminated from the opposite side of the transparent substrate, are set so as to be larger by the film thickness of the reflective film than the length and the width of the valley of the pit of the signal recording layer, the information from which is reproduced by forward direction reproduction with the reproducing light beam illuminated from the signal recording side of the transparent substrate, as in the present invention, the valley of the pit of the former signal recording layer irradiated with the reproducing light beam from the opposite side of the signal recording layers of the transparent substrate can be detected as being of the same apparent size as the valley of the pit of the latter signal recording layer irradiated with the reproducing light beam from the transparent substrate.

From the results of FIG. 10, it has also been confirmed that, if the asymmetry for the forward direction reproduction is set in a range from 10.0 to 18.0%, the jitter for the forward direction reproduction and that for the reverse direction reproduction become 7.0% or less, such that a sufficient signal volume can be achieved. It has however been confirmed that asymmetry in case of forward direction reproduction of the signal recording layer having the usual reflective film, that is asymmetry in case the signal recording layer, which should be irradiated with the reproducing light beam from the opposite side of the transparent substrate, is irradiated with the reproducing light beam from the transparent substrate for reproducing the information, is preferably in a range from 10% to 15% because high density recording can hardly be coped with if the value of asymmetry for forward direction reproduction is 15.0% or larger.

What is claimed is:

1. A method for producing an optical recording medium, the method comprising the steps of:

forming crests and valleys to form pits corresponding to information signals on a master disc by light exposure and corresponding development;

forming a transparent substrate having crests and valleys by transcription from the master disc;

forming a reflective film on a surface of the transparent substrate having said crests and valleys formed thereon; and bonding together first and second signal recording layers each of which is comprised of said transparent substrates having the reflective films formed thereon so that said signal recording layers are facing each other with an adhesive therebetween;

wherein, a length and a width W2 of a valley of said second signal recording layer from which information is reproduced by reverse direction reproduction by a light beam illuminated from the side of its reflective film are larger by a reflective film thickness than a length and a width W1 of a valley of said first signal recording layer from which information is reproduced by forward reproduction by a light beam illuminated from its transparent substrate, and said crests and valleys of said recording layers being formedso that an asymmetry A1 of reproduced signals obtained from said first signal recording layer by forward direction reproduction by irradiation from the side of its transparent substrate will be effectively equal to an asymmetry A2 of reproduced signals obtained from the second signal recording layer by reverse direction reproduction by being irradiated with a light beam through the transparent substrate of the first signal recording layer, asymmetry of reproduced signals being determined by the following relationship:

$$((I_{Ltop}+I_{Lpit})-(I_{Htop}+I_{Hpit}))/2(I_{Lpit}-I_{Ltop})$$

where $I_{Lpit}$, $I_{Ltop}$ denote return light levels of the longest valley and land, respectively, while $I_{Hpit}$ and $I_{Htop}$ denote return light levels of the shortest valley and land, respectively.

2. The method for producing the optical recording medium as claimed in claim 1 wherein the laser power and/or the developing time are controlled so that the crests and valleys on the transparent substrate of the signal recording layer irradiated with the light beam from the reflective film to the transparent substrate will be larger than those on the transparent substrate of the signal recording layer irradiated with the light beam from the transparent substrate to the reflective film.

3. The method of claim 1, wherein said crests and valleys of said second signal recording layer are formed such that an asymmetry A3 of reproduced signals obtained by forward direction reproduction by irradiating the second signal layer from the side of its transparent substrate is larger than the asymmetry A1.

4. The method of claim 3 wherein the asymmetry A3 is 10 to 15%.

* * * * *